United States Patent [19]
Graham

[11] 4,215,772
[45] Aug. 5, 1980

[54] RETARDER FOR GRAVITY CONVEYORS
[75] Inventor: James T. Graham, Rochester, Mich.
[73] Assignee: F. Jos. Lamb Company, Warren, Mich.
[21] Appl. No.: 43,252
[22] Filed: May 29, 1979
[51] Int. Cl.² .............................................. B65G 13/00
[52] U.S. Cl. .................... 193/35 A; 188/290
[58] Field of Search ............... 193/35 R, 35 A, 35 B, 193/40, 32; 188/290; 192/58 B

[56] References Cited
U.S. PATENT DOCUMENTS

| | | | |
|---|---|---|---|
| 3,045,780 | 7/1962 | Lees | 188/290 |
| 3,399,752 | 9/1968 | Orwin | 193/35 A |
| 3,511,350 | 5/1970 | Stein | 193/35 A |
| 3,861,503 | 1/1975 | Nash | 188/290 X |

Primary Examiner—Robert B. Reeves
Assistant Examiner—Gene A. Church
Attorney, Agent, or Firm—Barnes, Kisselle, Raisch & Choate

[57] ABSTRACT

A gravity conveyor retarder includes a housing having a cylindrical cavity in which a rotor connected with a rotatable member of the gravity conveyor rotates. The housing includes an annular reservoir surrounding the cavity and separated therefrom by an annular wall provided with a plurality of circumferentially spaced, radially extending, restricted passageways so that, regardless of the circumferential orientation of the housing, any air in the cavity will migrate upwardly therein, through the restricted passageways and accumulate above the liquid level at the upper end of the reservoir.

9 Claims, 8 Drawing Figures

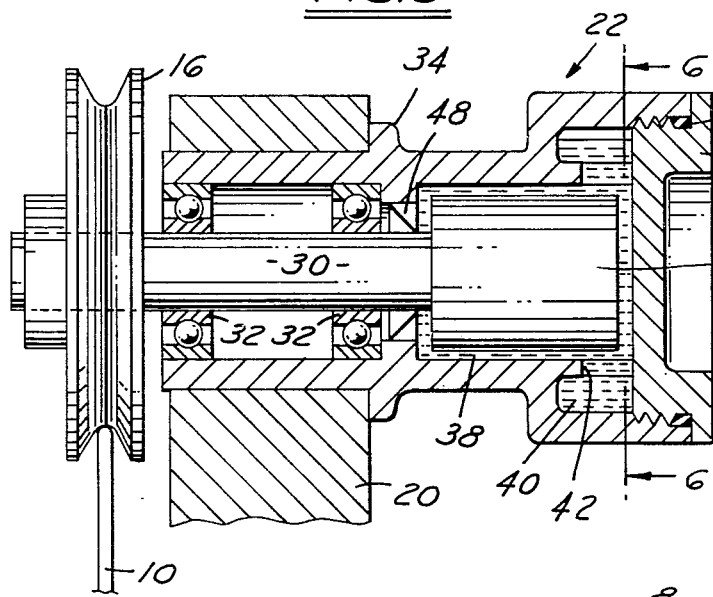
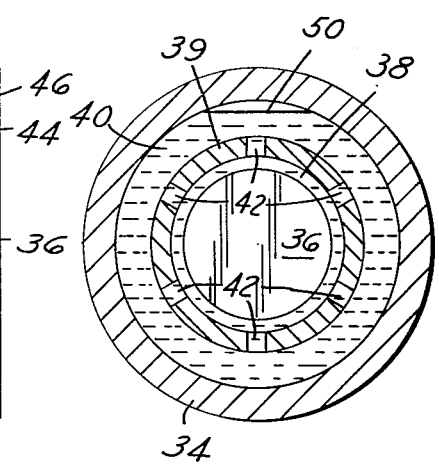
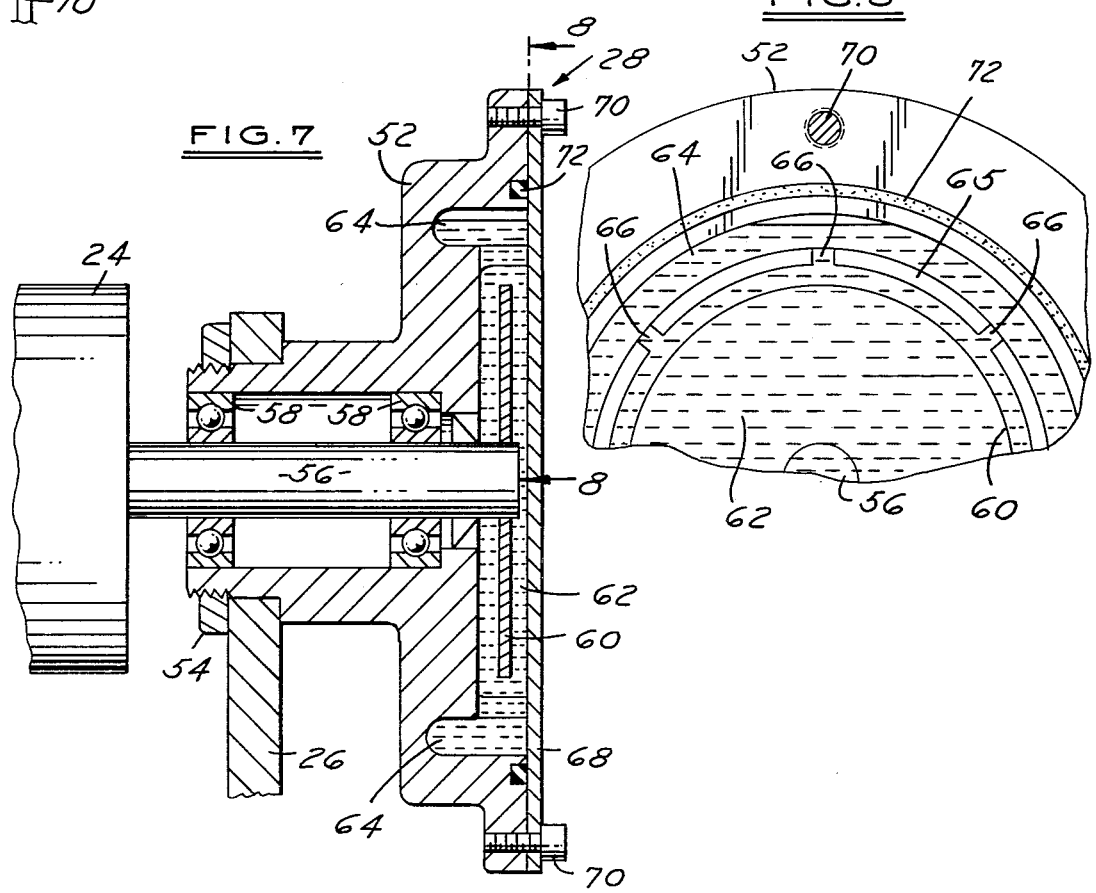

RETARDER FOR GRAVITY CONVEYORS

This invention relates to a retarder for gravity conveyors and, more particularly, to a viscous shear retarder for controlling the velocity of a load on a gravity powered conveyor.

Conveyors where the transported articles are supported on or by rolling elements that are arranged on a continuous downward incline and are powered by the force of gravity are commonly referred to as gravity conveyors. Gravity conveyors are extensively used in many industries, particularly in metal machining. Normally the use of such conveyors has been limited in the past for conveying relatively small workpieces of relatively rigid construction which are not subject to damage by impact. When a workpiece is placed on a gravity conveyor it will immediately start to travel and its speed will increase until a terminal velocity is reached or until it is stopped by such means as a mechanical barrier or by abutting the endmost upstream article in a queue of articles at rest on the conveyor. In the past the susceptibility to high velocity impact percluded the use of gravity conveyors for transporting heavy or easily damaged workpieces. Various methods have been devised to control the velocity of such workpieces on gravity conveyors. One of the most successful devices employed for this purpose is a retarding mechanism consisting of a rotating member confined in a cavity containing a viscous fluid. The rotating member of the retarder is drivingly connected to the rotating member of the gravity conveyor. With the selection of proper design parameters determined by the size of the rotating member, the degree of incline of the conveyor, etc., the resistance caused by the shear of the viscous fluid between the stationary wall of the cavity and the surface of the rotating member results in a velocity that is uniform and sufficiently low so that the impacting forces generated are not substantial. Such retarding mechanisms have been used extensively and permit the conveying of relatively heavy workpieces.

The use of such retarders to avoid the problem of high velocity impact creates another problem; namely, that resulting from the presence of air in the cavity that contains the viscous fluid. It is almost impossible to completely fill a cavity of this type with a viscous fluid and eliminate all of the air. Even if the air could be eliminated at the time of filling, some amount of leakage will inevitably occur around the seals that separate the fluid from the atmosphere. When the viscous fluid leaks out, air leaks in to replace it. When air is present in the cavity and the retarder is at rest, the air will migrate upwardly through the liquid and remain in the space above the liquid in the cavity. Then, when the fluid is agitated by the rotating member, it will tend to be displaced to the top of the cavity and, in turn, displace the air. The air is drawn downwardly between the rotor and the cavity wall where it becomes flattened into a sheet-like bubble between the two surfaces and displace a portion of the fluid that is normally in shear. This results in a substantial reduction in the magnitude of the viscous shear and allows the workpieces on the gravity conveyor to travel at a much faster rate than desired.

The primary object of this invention is to provide a retarder for a gravity powered conveyor of economical construction that avoids the problems caused by the presence of air in the rotor cavity, regardless of the orientation of the housing in which the rotor cavity is formed.

More specifically, in the retarding mechanism of the present invention the cavity in which the rotor is journalled is surrounded peripherally by a reservoir for liquid and air. The reservoir communicates with the rotor cavity by means of a plurality of restricted radially extending passageways. With such an arrangement regardless of the circumferential orientation of the housing defining the rotor cavity, air will always migrate upwardly in the rotor cavity, through the uppermost restricted passageways and into the uppermost portion of the reservoir. The liquid level in the reservoir is maintained above the uppermost radial passageway. Thus, when the rotor is rotated the liquid in the reservoir will not be agitated and the air above the quiescent liquid in the reservoir will not be drawn into the area of shear.

Other objects, features and advantages of the present invention will become apparent from the following description and accompanying drawings, in which:

FIG. 5 is a cross sectional view of a viscous shear retarder embodying the present invention as applied to a trolley-type gravity conveyor of the type illustrated in FIG. 1;

FIG. 6 is a sectional view along the line 6—6 in FIG. 5;

FIG. 7 is a cross sectional view of a viscous shear retarder embodying the present invention as applied to a gravity roller conveyor; and FIG. 8 is a fragmentary sectional view along the line 8—8 in FIG. 7.

Figure 1:
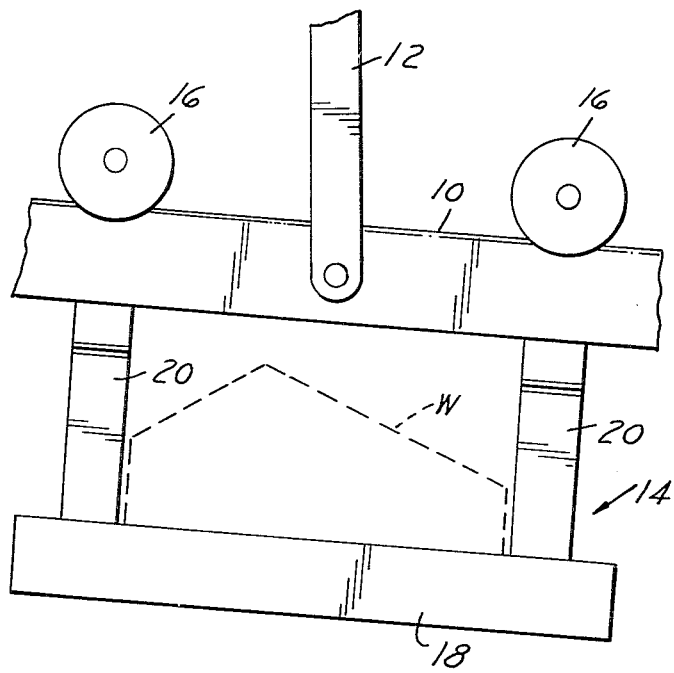
FIG. 1 is a fragmentary side elevational view or a trolley-type gravity conveyor showing a carrier supporting a workpiece.
Figure 2:
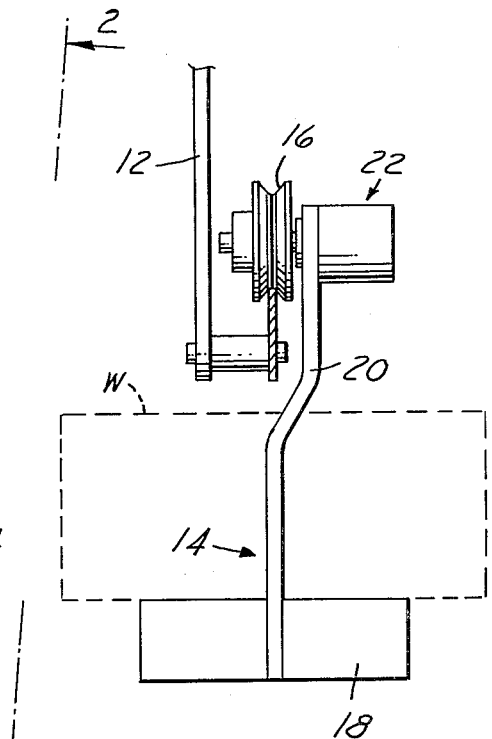
FIG. 2 is an end view of the arrangement shown in FIG. 1 taken along the line 2—2 in FIG. 1.

The trolley-type gravity conveyor shown in FIG. 1 includes a downwardly inclined trolley track 10 fixedly mounted on a superstructure by means of a bracket 12. The trolley, generally designated 14, includes a pair of grooved wheels 16 which ride on track 10 and which support a platform 18 by means of depending arms 20. A workpiece W is adapted to be carried by platform 18. Since the trolley track 10 is downwardly inclined, the trolley 14 is powered by gravity and its terminal velocity is maintained by a retarder 22.

Figure 3:
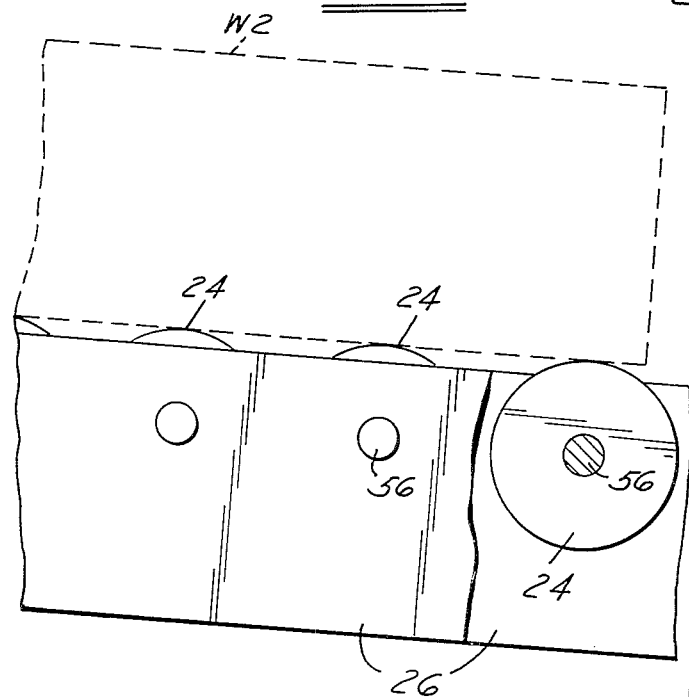
FIG. 3 is a fragmentary side elevational view of a gravity roller type conveyor.
Figure 4:
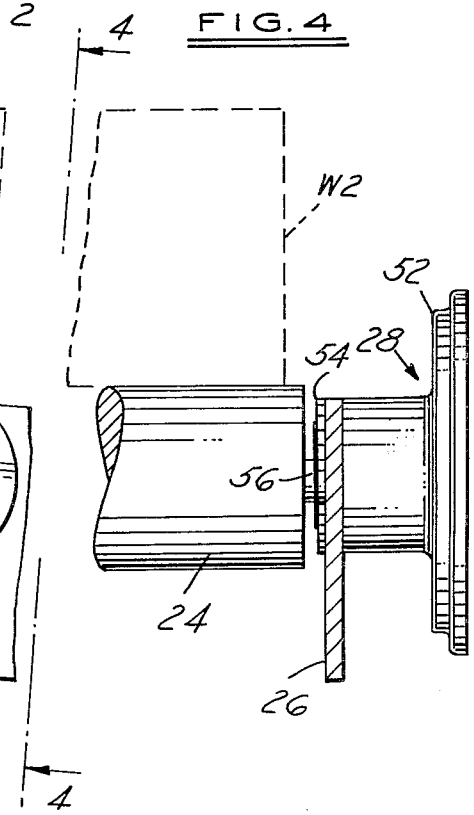
FIG. 4 is a fragmentary sectional view taken alont the line 4—4 in FIG. 3.

In FIGS. 3 and 4 there is illustrated a gravity conveyor of the roller type wherein a plurality of rollers 24 are journalled at their opposite ends in a pair of stationary, laterally spaced side plates 26. Side plates 26 are inclined downwardly and the rollers 24 are journalled thereon so that a workpiece W2 can be supported by the uppermost surface positions of the rollers and thereby conveyed in a downwardly inclined direction. The terminal velocity of the workpiece W2 is controlled by the retarding assemblies 28 connected to one end of rollers 24.

Referring now to FIGS. 5 and 6 where the retarder 22 for the trolley-type conveyor is illustrated, each grooved wheel 16 is fixed on a shaft 30 journalled by bearings 32 in a housing 34. Housing 34 is press fitted into or otherwise fixedly secured to the upper end of arm 20. At the end thereof opposite wheel 16 shaft 30 has a rotor 36 fixedly secured thereto so as to rotate with wheels 16. Housing 34 is formed with a coaxial cylindrical cavity 38 having a diameter and a length at least slightly larger than the diameter and length of rotor 36. Housing 34 is formed with an annular reservoir 40 extending entirely around cavity 38 at one end thereof. Reservoir 40 is in the form of a groove in the housing separated from cavity 38 by an annular wall 39. Reservoir 40 communicates with cavity 38 through a plurality of small radial passageways 42 spaced uniformly around wall 39. The number of restricted passegeways 42 is to a large extent determined by their size and the inner diameter of the annular wall 39 separating cavity 38 and reservoir 40. The equally spaced passageways 42 must be of sufficient number to prevent the formation of an undesirable bubble of air between the uppermost portion of the rotor and the radially adjacent portion of wall 39 when filled with liquid and housing 34 is circumferentially oriented such that a passageway 42 is not disposed directly above the uppermost portion of the rotor.

In the arrangement illustrated in FIG. 6 there are six restricted passageways 42. Thus, regardless of the circumferential orientation of housing 34, there is at least one passageway 42 sufficiently close to the top side of cavity 38 to allow any air in the cavity to migrate to the top of the reservoir when filled with liquid. Cavity 38 and reservoir 40 are sealed from the surrounding atmosphere by an end cap 44 which is threaded into the open end of housing 34. An annular seal 46 prevents leakage through the end cap 44 and another annular seal 48 prevents leakage around shaft 30. The end of wall 39 is coplanar with the end face of housing 34 and passageways 42 are formed by simply slotting the end portion of wall 39. With end cap 44 removed cavity 38 and reservoir 40 are substantially completely filled with a liquid that has Newtonian characteristics such as silicon oil. In FIG. 6 the liquid level in reservoir 40 after being filled is designated 50. It will be observed that this liquid level is above the uppermost restricted passageway 42 and above the uppermost portion of wall 39.

When rotor 36 rotates by reason of rolling engagement of wheel 16 on track 10 as the carrier travels down an incline, the liquid surrounding rotor 36 will be in shear. This results from the fact that a portion of the liquid tends to cling against the wall of cavity 38 and thus to remain static and another portion of the liquid tends to cling to the surface of rotor 36 and rotate with the rotor. This generates a braking force which prevents shaft 30 and wheel 16 from rotating freely. The force required to shear the liquid is directly proportional to the time rate of shear exerted on the liquid. Thus, the retarding torque exerted on shaft 30 by rotor 36 is directly proportional to the angular velocity of shaft 30. The factor of proportionality is dependent upon the viscosity of the liquid, the diameter of the rotor and the thickness of the liquid space that is in shear. The factors affecting the retarding force on rotor 36 resulting from shear in the liquid are well understood and need not be further described. It will be observed, however, that with the arrangement of the present invention the liquid level in reservoir 40 is always above the portion of the liquid in cavity 38 that is in shear. This results from the fact that, regardless of the circumferential orientation of housing 34, there is always a restricted passageway 42 adjacent the upper portion of reservoir 40. Thus when rotor 36 rotates, the liquid in cavity 38 is agitated to produce shear, but, in view of the restricted passageways 42, the liquid in reservoir 40 remains static and the air in reservoir 40 above the liquid level 50 will not be drawn down into the area of the agitated liquid in cavity 38.

In the arangement shown in FIG. 7 the retarder includes a housing 52 mounted on the side plate 26 of the roller conveyor as by a nut 54. Shaft 56 to which the roller 24 is rotatably fixed is journalled in housing 52 by bearings 58. At the end of shaft 56 opposite roller 24 a disc 60 is fixed to the shaft. The open end of the housing 52 is formed with a cylindrical cavity 62 having a diameter and an axial thickness at least slightly greater than the diameter and thickness of disc 60. Housing 52 is also formed with an annular groove 64 spaced radially outwardly from the outer periphery of cavity 62 by a wall 65 and communicating therewith by a plurality of restricted radial passageways 66. Groove 64 forms a reservoir around cavity 62 which serves the same purpose as the reservoir 40 shown in FIGS. 5 and 6. The restricted passageways 66 are formed in the same manner and serve the same purpose as the restricted passageways 42. However, since the annular wall 65 is of substantially larger diameter than wall 39, eight passageways 66 are formed in wall 65. The open end of housing 52 is closed by a cover plate 68 which is secured to the housing by screws 70. An annular seal 72 prevents leakage between housing 52 and cover plate 68 and another annular seal 74 prevents leakage around shaft 56. Cover plate abuts the end of wall 65.

In the arrangement shown in FIG. 7 the shear occurs primarily at the opposite side faces of disc 60 in contrast to the shear which occurs primarily around the outer cylindrical surface of rotor 36 in the arrangement shown in FIGS. 5 and 6. In other respects the arrangement shown in FIGS. 7 and 8 operates in substantially the same manner as the arrangement shown in FIGS. 5 and 6. The terminal velocity of roller 24 is determined by the same factors that determine the terminal velocity of wheel 16.

It will be appreciated that in FIGS. 1, 2, 5 and 6 either one or both of the wheels 16 may have the retarder 22 connected therewith and in the arrangement shown in FIGS. 3, 4, 7 and 8 the retarder 28 may be associated with each of rollers 24 or only selected ones of the rollers. In any event, regardless of the circumferential orientation of the retarder housing, in view of the plurality of circumferentially spaced restricted passageways between the rotor cavity and the reservoir the air in the system will always migrate to the top of the reservoir, and, since the oil level in the reservoir is above the uppermost restricted passageway, the oil in the reservoir will remain relatively static at all times and the air will not be drawn into the liquid zone subjected to viscous shear by reason of rotation of the rotor. This enables the housing to be manufactured economically and to be mounted on its support with random orientation.

I claim:

1. In a gravity conveyor of the type having a work support member mounted on a frame member for rotation about a generally horizontal axis in response to gravitational forces generated by the weight of a load supported by the rotatably member the combination comprising a housing fixedly mounted on said frame member and having a cylindrical cavity therein coaxial with the axis of rotation of the rotatable member, said rotatable member having an axial extension projecting into said housing, a rotor fixed on said extension and disposed within said cavity for rotation therein, the outer surfaces of said rotor being spaced from and relatively closely adjacent the walls of said cavity, said housing having an annular reservoir therein spaced radially outwardly of and surrounding said cavity and separated therefrom by an annular wall, said wall having a plurality of generally uniformly circumferentially spaced restricted radial passageways therein extending between said cavity and said reservoir, and means permitting filling of said cavity and said reservoir regardless of the circumferential orientation of said restricted passageways with a sufficient amount of liquid as to enable any air entrapped in said cavity to migrate upwardly through said restricted passageways into the upper portion of the reservoir and so that the liquid level in the reservoir is above the uppermost portion of said annular wall, whereby, when said rotor is rotated, the liquid in the cavity surrounding the rotor is agitated and thereby placed in shear and the liquid in the reservoir remains substantially static.

2. The combination set forth in claim 1 wherein said rotatable member comprises a work supporting roller and said frame member comprises a downwardly inclined support for the roller.

3. The combination set forth in claim 1 wherein said rotatable member comprises a wheel engageable with a downwardly inclined track and said frame member comprises a bracket assembly for supporting a workpiece on said track by means of said wheel.

4. The combination set forth in claim 1 wherein said extension comprises a shaft projecting from one end of the rotatable member and journalled in said housing adjacent one end of said cavity.

5. The combination set forth in claim 1 wherein said housing is mounted on said frame member in random circumferential orientation relative to the frame member.

6. The combination set forth in claim 1 wherein said reservoir and cavity are open at one end of said housing and said means for permitting filling of the cavity and reservoir with liquid includes a removable cover plate overlying the open end of the cavity and reservoir in sealed relation with said one end of the housing.

7. The combination set forth in claim 6 wherein said reservoir comprises an annular groove in said housing extending axially inwardly from the open end of the housing.

8. The combination set forth in claim 6 wherein said annular wall has one end thereof in axially abutting relation with the inner face of said cover plate.

9. The combination set forth in claim 8 wherein said radial passageways comprise slots extending axially inwardly from said one end of the annular wall.

* * * * *